USo08751744B2

(12) United States Patent
Deleris et al.

(10) Patent No.: US 8,751,744 B2
(45) Date of Patent: Jun. 10, 2014

(54) INTEGRATED CIRCUIT COMPRISING TRACE LOGIC AND METHOD FOR PROVIDING TRACE INFORMATION

(75) Inventors: Bertrand Deleris, Seysses (FR); Rich Collins, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 199 days.

(21) Appl. No.: 13/318,542

(22) PCT Filed: May 29, 2009

(86) PCT No.: PCT/IB2009/053530
§ 371 (c)(1),
(2), (4) Date: Nov. 2, 2011

(87) PCT Pub. No.: WO2010/136852
PCT Pub. Date: Dec. 2, 2010

(65) Prior Publication Data
US 2012/0072666 A1    Mar. 22, 2012

(51) Int. Cl.
*G06F 12/00*    (2006.01)
*G06F 11/36*    (2006.01)

(52) U.S. Cl.
CPC .................................. *G06F 11/3636* (2013.01)
USPC ......................................................... 711/118

(58) Field of Classification Search
None
See application file for complete search history.

(56) References Cited

U.S. PATENT DOCUMENTS

| 5,321,828 | A | * | 6/1994 | Phillips et al. ................... 703/28 |
| 6,493,868 | B1 | | 12/2002 | Dasilva et al. |
| 6,779,145 | B1 | * | 8/2004 | Edwards et al. ............... 714/733 |
| 7,051,239 | B2 | | 5/2006 | Litt |
| 7,162,411 | B2 | | 1/2007 | Agarwala et al. |
| 7,165,018 | B2 | | 1/2007 | Flores et al. |
| 7,200,776 | B2 | | 4/2007 | Harris |
| 7,603,589 | B2 | * | 10/2009 | Swoboda ........................ 714/45 |
| 2002/0174416 | A1 | | 11/2002 | Bates et al. |
| 2005/0120348 | A1 | | 6/2005 | Mayer et al. |
| 2007/0105607 | A1 | | 5/2007 | Russell et al. |
| 2009/0063907 | A1 | | 3/2009 | Tsuboi et al. |
| 2010/0268990 | A1 | * | 10/2010 | Xu et al. ......................... 714/27 |

FOREIGN PATENT DOCUMENTS

EP    0636976    A    2/1995

OTHER PUBLICATIONS

International Search Report and Written Opinion correlating to PCT/IB2009/052019 dated Feb. 3, 2010.

* cited by examiner

*Primary Examiner* — Brian Peugh

(57) ABSTRACT

An integrated circuit comprises trace logic for operably coupling to at least one memory element and for providing trace information for a signal processing system. The trace logic comprises trigger detection logic for detecting at least one trace trigger, memory access logic arranged to perform, upon detection of the at least one trace trigger, at least one read operation for at least one memory location of the at least one memory element associated with the at least one detected trigger, memory content message generation logic arranged to generate at least one memory content message comprising information relating to a result of the at least one read operation performed by the memory access logic, and output logic for outputting the at least one memory content message.

20 Claims, 5 Drawing Sheets

INTEGRATED CIRCUIT COMPRISING TRACE LOGIC AND METHOD FOR PROVIDING TRACE INFORMATION

FIELD OF THE INVENTION

The field of this invention relates to an integrated circuit comprising trace logic and a method for providing trace information. More particularly, the field of this invention relates to trace logic for providing trace information for a signal processing system and a method therefor.

BACKGROUND OF THE INVENTION

In order to ease debugging of embedded software, it is known for many modern systems on chip (SoCs) to comprise dedicated hardware trace modules. Such hardware trace modules allow non-intrusive program tracing and data accesses tracing on virtual buses (between cores and caches), whereby program changes of flow or data accesses are reported in the form of trace messages, which may be sent on a dedicated trace port to an external debugger, or stored within embedded memory for later retrieval. Known debugging interface standards include Nexus™ (IEEE-ISTO 5001-2003) and ARM's™ Embedded Trace Macrocell™ (ETM). It is also known for hardware trace modules to comprise direct memory access (DMA) capability, enabling a host debugger to read from and write to buffers.

FIG. 1 illustrates an example of an SoC 100 comprising a known hardware trace module 110. The hardware trace module 110 is operably coupled to a virtual bus 125 between, for the illustrated example, a core element 120 and a data buffer in the form of a cache 130. The hardware trace module 110 is able to trace program changes of flow and/or data accesses between the core 120 and the cache 130. Upon detection of such a program change of flow and/or data access, the hardware trace module 110 generates a trace message that is then able to be used by a debugging tool 140 to monitor execution of software by the system 100. For example, the hardware trace module 110 may be operably coupled to a dedicated trace port 150, via which the hardware trace module 110 may directly output the trace message to the external debugging tool 140. Alternatively, the hardware trace module 110 may be operably coupled to a virtual trace buffer located within an area of system memory 160, or a dedicated trace buffer 170, and the hardware trace module 110 may output trace messages to the virtual/dedicated trace buffer for subsequent retrieval by the debugging tool 140.

Known hardware trace modules suffer from a number of limitations. For example, known hardware trace modules, such as the hardware trace module 110 of FIG. 1, trace changes of program flow or data accesses on a virtual bus 125 between a system element, such as a core 120, and a data buffer. Accordingly, trace messages are only generated on read/write accesses for the data buffer made by that system element. For data buffers that are dedicated to the system element, such as cache 130, the generation of trace messages only on read/write accesses made by that system element may be sufficient for an external debugger to accurately monitor the content of the data buffer as seen by the that system element during software execution. However, for shared data buffers 180, such as comprising DMA functionality or hardware accelerators 190, the generation of trace messages only on read/write accesses by, say, a core element 120 is not sufficient to accurately observe the content of the shared data buffers, since read/write accesses performed other than by the core element will not be traced. This can significantly complicate debugging, in particular with respect to hardware/software partitioning and hardware accelerators.

In an attempt to overcome this limitation and to provide a more complete system picture during debugging, it is known to provide an SoC with multiple hardware trace modules. For example, and as illustrated in FIG. 2, a first hardware trace module 110 for monitoring a core element may be operably coupled to a virtual bus 125 between a core element 120 and a data buffer in the form of cache 130, in the same manner as for the example of FIG. 1. An additional hardware trace module 210 is operably coupled to a shared bus 220 that provides system elements with access to system memory 160, and in particular to the shared buffer 180 therein. In this manner, the additional hardware trace module 210 is able to monitor read/write accesses to the shared buffer 180 by system elements other than the core 110, enabling the content of the shared buffer 180 to be more accurately traced as compared with the example of FIG. 1. However, the need for additional hardware trace modules to provide a more complete system picture adds cost and complexity to the system, and takes up valuable space within the SoC/integrated circuit.

Another limitation of known hardware trace modules is that trace messages only contain the data accessed. For example, in the case of a 32 bit access to a 1 k bit buffer, only the 32 bits of data access are reported within the trace message. The rest of the content of the 1 k bit buffer is not reported. As a result, only a limited representation of the content of the buffer is available to a debugging tool, thereby limiting the ability of the debugging tool to provide a more complete system picture.

SUMMARY OF THE INVENTION

The present invention provides an integrated circuit comprising trace logic, and a method for providing trace information as described in the accompanying claims.

Specific examples of the invention are set forth in the dependent claims.

These and other aspects of the invention will be apparent from and elucidated with reference to the examples described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION

An example will now be described with reference to a simplified system on chip (SoC) architecture comprising a single central processing unit (CPU) core and a single system memory element comprising shared access capabilities, such as via direct memory access (DMA) functionality, hardware accelerator functionality or some other shared access capabilities. However, the example described is not limited to use within such an SoC, and may be equally applied to alternative system architectures, for example comprising a plurality of CPU cores, a plurality of memory elements, etc. Furthermore, because the apparatus implementing the present invention is, for the most part, composed of electronic components and circuits known to those skilled in the art, circuit details will not be explained in any greater extent than that considered necessary as illustrated below, for the understanding and appreciation of the underlying concepts of the present invention and in order not to obfuscate or distract from the teachings of the present invention.

Figure 1:
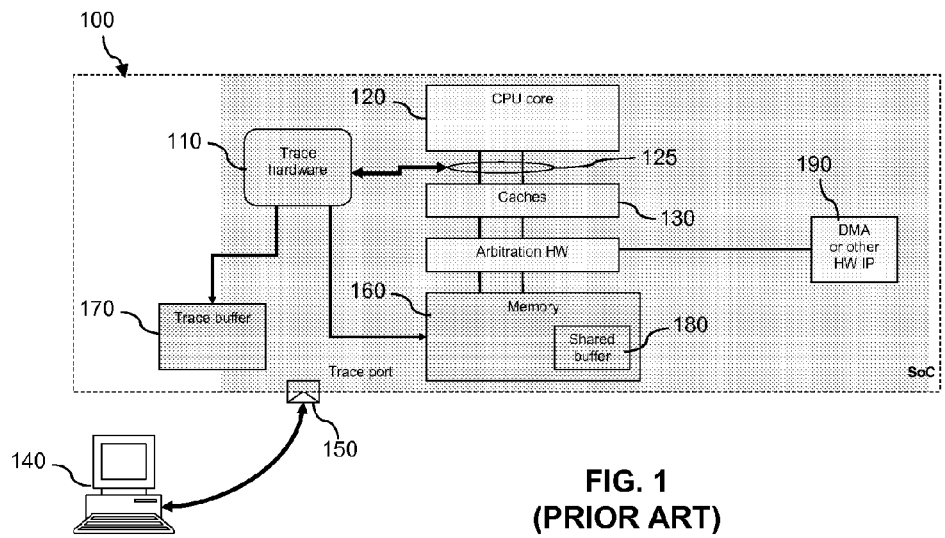
FIG. 1 illustrates an example of a signal processing system comprising a known hardware trace module.
Figure 2:
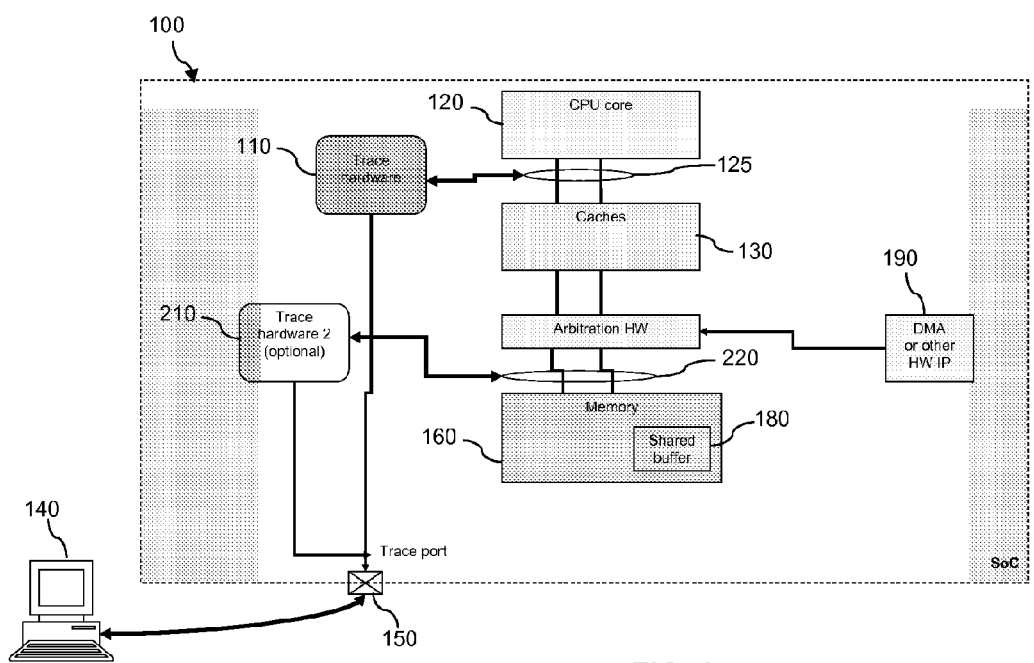
FIG. 2 illustrates an example of a signal processing system comprising an alternative known hardware trace module arrangement.
Figure 3:
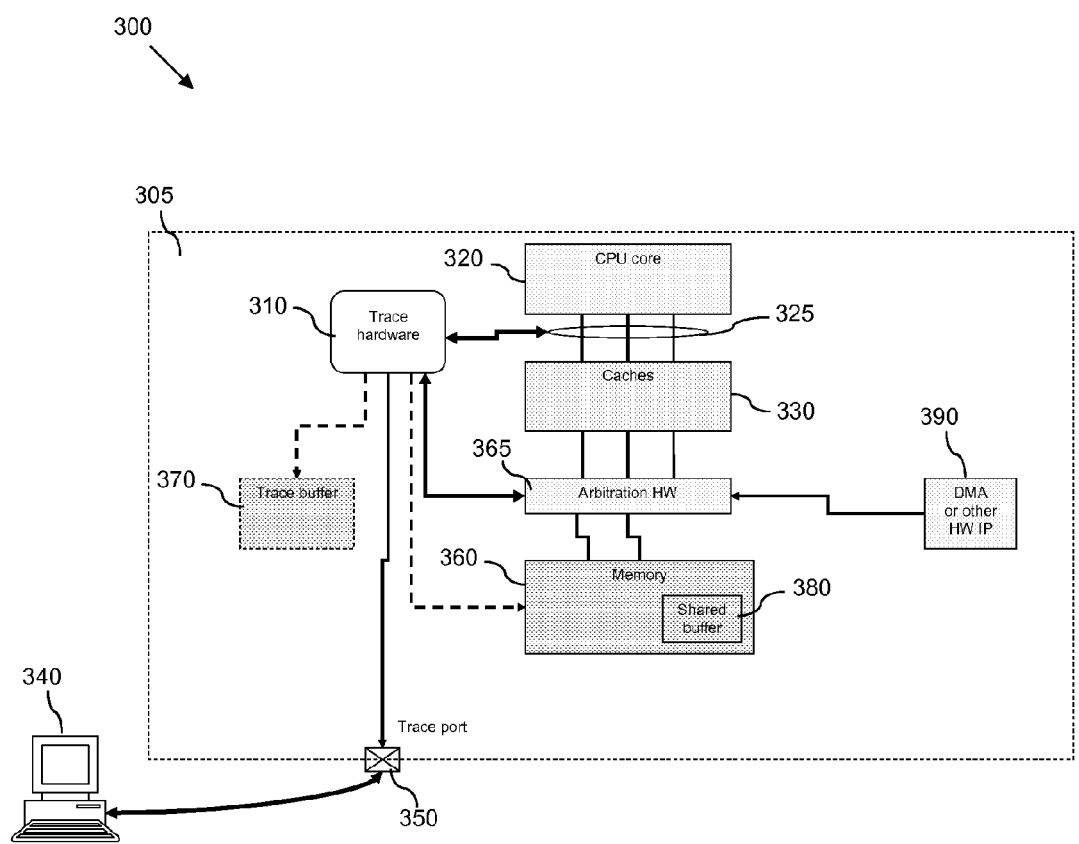
FIG. 3 illustrates an example of a simplified block diagram of a signal processing system.

Referring now to FIG. 3, there is illustrated an example of a simplified block diagram of a signal processing system 300 forming part of a system on chip (SoC) within an integrated circuit (IC) 305. For the illustrated example, the signal processing system 300 comprises a signal processing element in the form of a central process unit (CPU) core 320. The core 320 is operably coupled to a memory element in a form of a cache element 330 via a virtual bus 325. The core 320 is further operably coupled to a system memory element 360 via arbitration hardware 365.

The integrated circuit 305 further comprises trace logic 310 for providing trace information for the signal processing system 300. For the illustrated example, the trace logic 310 is operably coupled to the virtual bus 325, and arranged to trace changes of program flow and/or data accesses on the virtual bus 325 between the core 320, and the cache element 330. The trace logic 310 is further arranged to output trace information for processing by an external tool, such as a debug tool 340. For example, the trace logic may be operably coupled to a trace port 350, and arranged to output trace information to the trace port 350, which may then be received by the debug tool 340 directly via the trace port 350. Alternatively (or additionally), the trace logic 310 may be arranged to output trace information to a trace buffer, such as a virtual trace buffer within system memory element 360, or a dedicated trace buffer 370. The trace logic 310 may conform to aspects of known debug and trace interfaces, such as Nexus™ (IEEE-ISTO 5001-2003) and ARM's™ Embedded Trace Macrocell™ (ETM).

Figure 4:
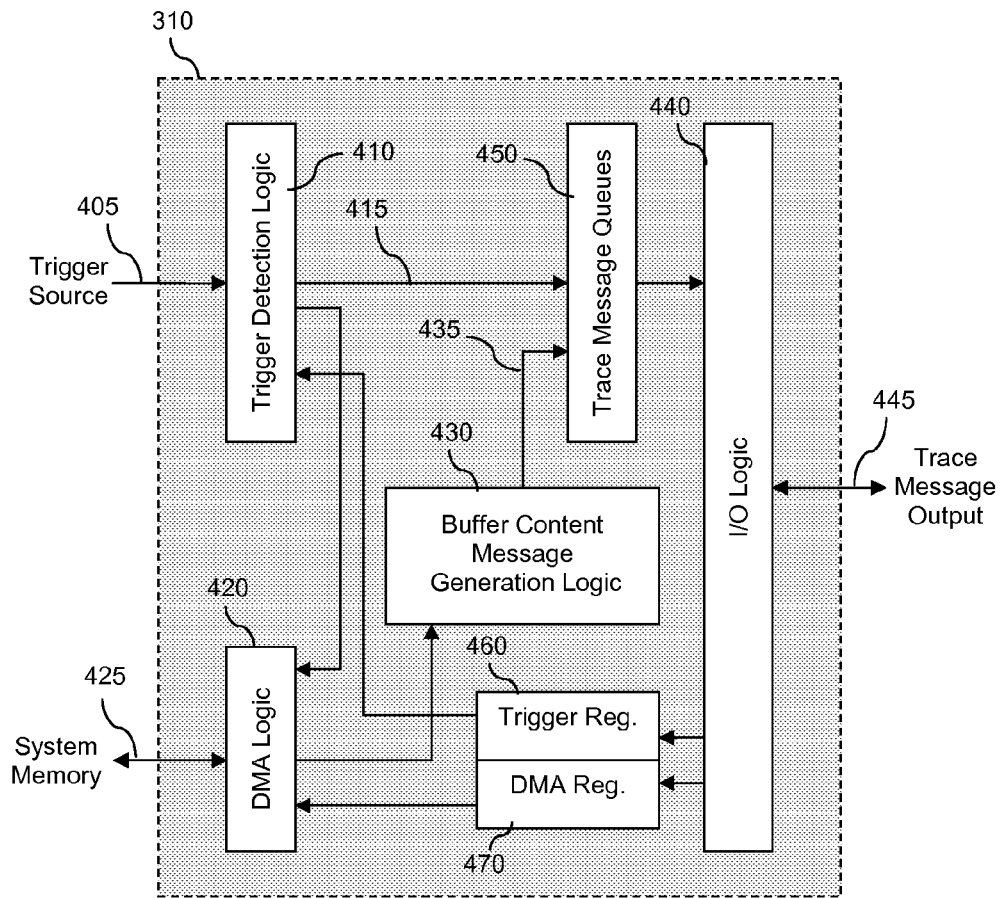
FIG. 4 illustrates an example of trace logic.

Referring now to FIG. 4, there is illustrated a simplified block diagram of an example of the trace logic 310 of FIG. 3. The trace logic 310 comprises trigger detection logic 410 arranged to detect at least one trace trigger 405. The trace logic 310 further comprises memory access logic, which for the illustrated example comprises direct memory access (DMA) logic 420. The memory access logic 420 is arranged to perform, upon detection of the at least one trace trigger 405 by the trigger detection logic 410, at least one read operation 425 for at least one memory location 380 associated with the at least one detected trigger 405. The trace logic 310 further comprises memory content message generation logic 430 for generating at least one memory content message 435 comprising information relating to a result of the at least one read operation performed by the memory access logic 420. The trace logic 310 further comprises output logic, which for the illustrated example comprises input/output logic 440, for outputting 445 the at least one memory content message 435.

By way of example, the trigger detection logic 310 may be arranged to detect one or more triggers in a form of changes of program flow or specific data accesses on the virtual bus 325, such as by detecting specific process and/or data addresses. Upon detection of such a trigger, the memory access logic 420 performs a read operation for one or more memory locations, for example such as a shared buffer 380 within the system memory 360, the one or more memory locations being associated with the detected trigger. The result of the read operation, for example the content of the one or more memory locations read, may then be encapsulated within one or more memory content messages 435 by the content message generation logic 430, and outputted by the input/output logic 440.

In this manner, when a trigger event occurs, trace information comprising the content of an area of memory such as the shared memory buffer 380 may be provided to, say, the debug tool 340. As a result, trace information is provided that enables a debug tool or the like to more accurately observe the content of shared memory, such as shared buffer 380, thereby enabling read/write accesses performed other than by the core element 320, such as by via direct memory access functionality 390, to be traced, and not just read/write access by the core 320.

In accordance with some examples, the trigger detection logic 410 may be arranged, upon detection of the at least one trace trigger 405, to generate at least one trace trigger message 415 for outputting by the input/output logic 440. For the illustrated example, the trace logic 310 further comprises message queuing logic 450, which is arranged to receive memory content messages 435 generated by memory content message generation logic 430 and trace trigger messages 415 generated by trigger detection logic 410, and to queue the received messages for outputting by input/output logic 440.

In this manner, the trace logic 310 may be arranged to provide both trace information relating to the detected trigger, as well as the content of an area of memory associated with that trigger. As a result, a debug tool or the like is able to correlate conventional trace information relating to the detected trigger (for example occurring on the virtual bus between the core 320 and the cache 330) with the additional trace information comprising the content of the associated area of memory (for example within shared buffer 380). In this manner, a debug tool or the like is provided with enhanced debug capabilities, for example during cache debugging, shared buffer debugging, etc.

Significantly, such additional trace information comprising the content of the associated area of memory is provided by the trace logic 310 without the need for additional hardware trace modules to be provided. Furthermore, such additional trace information may be provided without the need for external prompting or commands, for example via the trace port 350. Consequently, such additional trace information may be obtained substantially automatically, without the need to halt the core 320, which is unacceptable for real-time constrained systems such as 3G (3rd generation of telecommunication hardware standards) modems or automotive control systems.

For the example illustrated in FIGS. 3 and 4, the trace logic 310, and in particular the memory access logic 420, is operably coupled to the system memory 360 via arbitration hardware 365. In this manner, the trace logic 310 is able to access the system memory 360 directly, without going through the virtual bus 325 and cache 330. As a result, the trace logic 310 is provided with substantially direct access to the content of the system memory 360. Thus, such access is substantially not affected by the content of the cache 330.

In some examples, the triggers to be detected by the trace logic 310 may be configurable. For example, the trace logic 310 may be configured by way of the trace port 350 to detect specific changes of program flow, data accesses on the virtual bus, process addresses and/or data addresses. Accordingly, for the example illustrated in FIG. 4, the trace logic 310 may comprise one or more trigger registers 460 operably coupled to the input/output logic 440. In this manner, a debug tool or the like may program trigger parameters into the trigger registers 460 via a Jtag port. Jtag is used as a debug port to access the registers but is separate from the trace port defined in Nexus/ETM standards for instance, which output the trace messages The trigger detection logic 410 is operably coupled to the trigger registers 460, and arranged to detect triggers according to the parameters stored in trigger registers 460.

Furthermore, in some examples, a memory address and/or a memory size with which each detected trigger is associated may be configurable. For example, the trace logic 310 of FIG. 4 may comprise one or more memory access registers 470 operably coupled to the input/output logic 440. In this manner, a debug tool or the like may programme memory addresses and memory sizes with which each trigger configured in the trigger register(s) 460 is to be associated into the memory access register(s) 470. The memory access logic 420 may be operably coupled to the memory access registers 470 and arranged to perform one or more read operations upon detection of a trigger in accordance with memory address and/or memory size parameters associated with the detected trigger stored in the memory access registers 470.

In this manner, both the memory location(s) to which the at least one read operation is performed by the memory access logic 420, and the size of the area of memory to be read may be configured, thereby enabling flexibility in the provision of trace information. Significantly, such flexibility enables trace information to be provided that contains not just, say, the 32 bits of data accessed by the core element 320 via the virtual bus 325, but also additional memory content such as the entire content of a data buffer to which the data access was made, if desired, or even an entirely different data buffer to the one accessed.

The memory content messages may comprise any suitable format, and in particular may encapsulate the content of accessed memory in accordance with any suitable protocol, such as a proprietary, vendor-specific protocol. For example, a memory content message may be generated to encapsulate each word read from memory.

Figure 5:
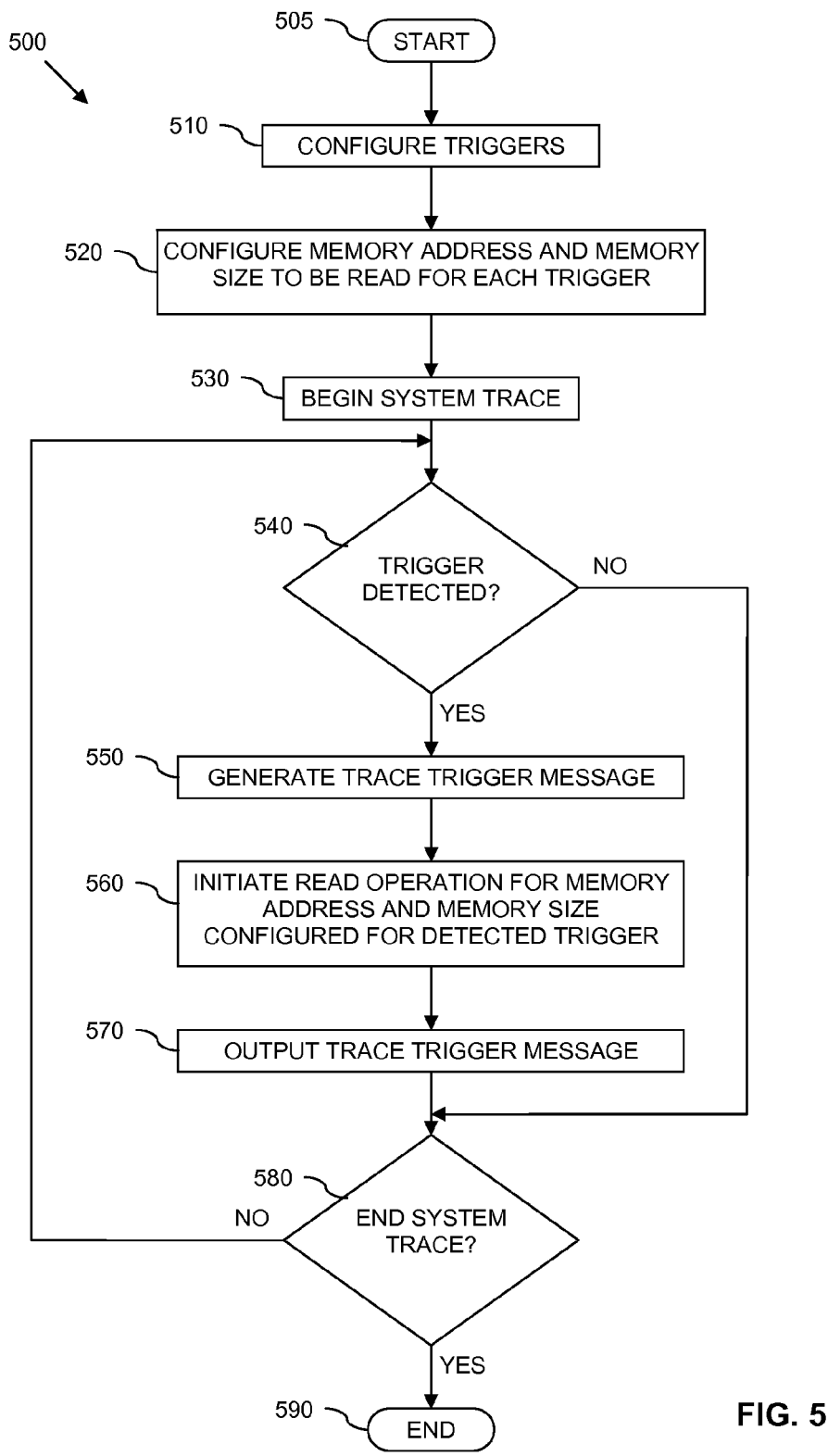
FIGS. 5 and 6 illustrate simplified flowcharts of an example of a method for providing trace information.

Referring now to FIG. 5, there is illustrated a simplified flowchart 500 of an example of a method for providing trace information for a signal processing system. The method starts at 505, and moves on to step 510 where triggers to be detected are configured. Next, in step 520, memory address and memory sizes associated with the triggers to be detected are configured. The method then moves to step 530, with the beginning of the system trace. Next, in step 540, it is determined whether a trigger has been detected. If no trigger has been detected, the method moves to step 580, where it is determined whether the system trace should end, for example upon receipt of a command from an external debug tool or the like. Referring back to step 540, if a trigger is detected, the method moves on to step 550 where a trace trigger message is generated comprising trace information relating to the detected trigger. Next, in step 560, a read access is initiated for one or more memory addresses and memory size(es) as configured in step 520 for the detected trigger. The trace trigger message generated in step 550 is then output in step 570. The method then moves on to step 580, where it is determined whether the system trace should end. If it is determined that the system trace should end, the method moves on to step 590 and ends. Otherwise, the method loops back up to step 540, where it is determined whether a (further) trigger has been detected.

Figure 6:
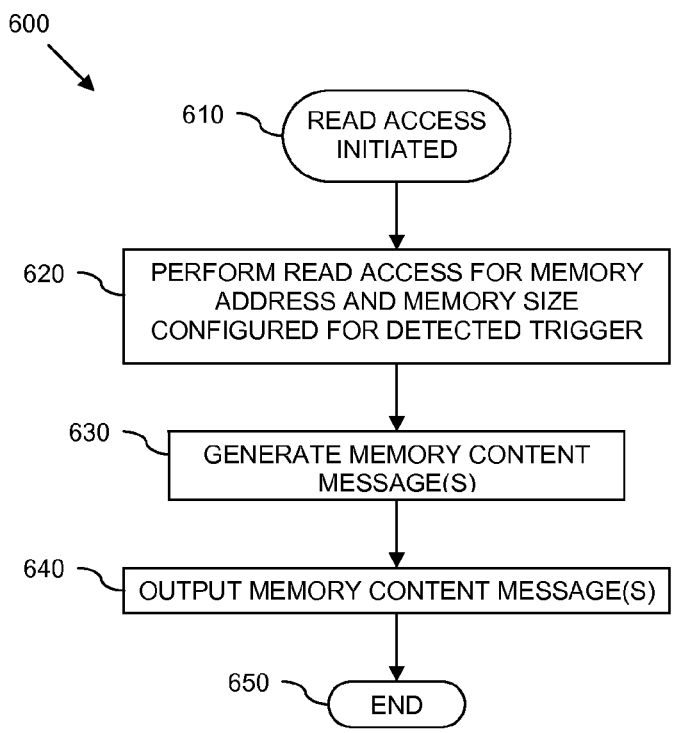

Referring now to FIG. 6, there is illustrated a simplified flowchart 600 of an example of a read operation initiated in step 560 of FIG. 5. The read operation begins at step 610, upon initiation within, for example, step 560 of the method of FIG. 5, and moves on to step 620 where one or more read access(es) is/are performed for one or more memory addresses and memory size(es) as configured in step 520 for the detected trigger. Next, in step 630, one or more memory content messages are generated comprising information relating to the result of the read access(es). The memory content message(s) is/are then output in step 640, and the method ends at 650.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 3 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Also for example, in one embodiment, the illustrated elements of system 300 comprise circuitry located on a single integrated circuit or within a same device. Alternatively, system 300 may include any number of separate integrated circuits or separate devices interconnected with each other. For example, memory 360 may be located on a same integrated circuit as core element 320 or on a separate integrated circuit or located within another peripheral or slave discretely separate from other elements of system 300.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit (IC) comprising:
   trace logic for operably coupling to a system memory element and for providing trace information for a signal processing system, the trace logic comprising:
   trigger detection logic for detecting a trace trigger in response to a first address being transmitted on a virtual bus between a system core element and a cache memory element;
   memory access logic arranged to provide a read request to memory access arbitration hardware, in response to the trace trigger, for data information stored at the system memory element;
   in response to receiving the data information, message generation logic arranged to generate a first trace message comprising the data information; and
   output logic for outputting the first trace message.

2. The integrated circuit of claim 1 wherein the trigger detection logic is arranged, in response to the trigger detection logic detecting the trace trigger, to generate a second trace message for outputting by the output logic indicating the trace trigger was detected.

3. The integrated circuit of claim 2 wherein the trace logic further comprises message queuing logic for queuing the first and second trace messages for output by the output logic.

4. The integrated circuit of claim 3 wherein the trigger detection logic is operably coupled to the virtual bus of the signal processing system, and is arranged to detect the first address being transmitted on the virtual bus between the system core element and the cache memory element.

5. The integrated circuit of claim 2 wherein the trigger detection logic is operably coupled to the virtual bus of the signal processing system, and is arranged to detect the first address being transmitted on the virtual bus between the system core element and the cache memory element.

6. The integrated circuit of claim 1 wherein the trigger detection logic is operably coupled to the virtual bus of the signal processing system, and is arranged to detect the first address being transmitted on the virtual bus between the system core element and the cache memory element.

7. The integrated circuit of claim 1 wherein an address accessed by the read request, in response to the trace trigger, is configurable.

8. The integrated circuit of claim 1 wherein the memory access logic comprises direct memory access (DMA) logic operably coupled to the system memory element of the signal processing system.

9. The integrated circuit of claim 1 wherein the output logic is arranged to output the first trace message to at least one from a group of:
   a trace port;
   a virtual trace buffer within the system memory element; and
   a dedicated trace buffer.

10. The Integrated circuit of claim 1 wherein the first address comprises at least one from a group of:
    an indication of a change of program flow;
    an indication of a specific data access;
    a process address;
    a data address.

11. The Integrated circuit of claim 1 wherein the trace logic is a hardware trace module.

12. The Integrated circuit of claim 1 wherein the trace logic is operably coupled to a trace port and at least one from the following group is arranged to be configurable via the trace port:
    the trace trigger to be detected by the trigger detection logic;
    an address accessed by the read request;
    a memory size associated with the read request.

13. A method for providing trace information for a signal processing system, the method comprising:
    generating a trace trigger in response to a first address being transmitted on a virtual bus between a system core element and a cache memory element;

in response to the trace trigger, providing a read request to arbitration hardware from a trace module for data information of a system memory;

receiving the data information at the trace module as a result of the read request; generating, by the trace module, a first trace message comprising the data information; and outputting the first trace message.

14. The method of claim 13, wherein generating the trace trigger is further in response to the first address matching a stored address.

15. The method of claim 13, wherein the first address being transmitted comprises an indication of a change of program flow.

16. The method of claim 13, wherein the first address being transmitted comprises a process address.

17. The method of claim 13, wherein the first address being transmitted comprises an indication of a specific data access.

18. The method of claim 13, wherein the first address being transmitted comprises a data address.

19. A method for providing trace information for a signal processing system, the method comprising:

generating a trace trigger in response to an address corresponding to first data information being transmitted;

in response to the trace trigger, performing a read operation at a memory location that includes the address;

generating a memory content trace message comprising the first data information read from the memory location; and outputting the memory content trace message.

20. The method of claim 19, wherein the read operation is between a trace logic and a system memory via an arbitration hardware; and wherein the first data information read from the memory location is received by the trace logic from the system memory via the arbitration hardware.

* * * * *